United States Patent
Souza

[19]

[11] Patent Number: 6,042,130
[45] Date of Patent: Mar. 28, 2000

[54] CARRIER DEVICE

[76] Inventor: Peter R. Souza, 35 Pico Ave., Winthrop, Mass. 02152

[21] Appl. No.: 09/061,221

[22] Filed: Apr. 16, 1998

[51] Int. Cl.$^7$ ........................................................ B62B 1/14
[52] U.S. Cl. ........................................ 280/79.5; 414/490
[58] Field of Search ................................ 280/79.5, 47.29, 280/645, 652, 30, 643

[56] References Cited

U.S. PATENT DOCUMENTS

| | | | |
|---|---|---|---|
| 4,289,326 | 9/1981 | Hawkes | 280/646 |
| 4,544,173 | 10/1985 | Kellermyer | 280/47.33 |
| 4,865,346 | 9/1989 | Carlile | 280/654 |
| 4,889,267 | 12/1989 | Bolton | 224/274 |
| 5,201,638 | 4/1993 | Bieri | 417/234 |
| 5,393,080 | 2/1995 | Ross | 280/47.26 |
| 5,454,576 | 10/1995 | Pitkanen | 280/42 |
| 5,489,183 | 2/1996 | Malden et al. | 280/47.28 |
| 5,752,634 | 5/1998 | Kortman | 280/645 |

FOREIGN PATENT DOCUMENTS 225710   7/1969   U.S.S.R. .

Primary Examiner—Brian L. Johnson
Assistant Examiner—Michael Britton

[57] ABSTRACT

A new carrier device for holding a container, such as a propane gas tank. The inventive device includes a back member having top and bottom ends and a pair of sides extending between the top and bottom ends of the back member. The bottom end of the back member has a plurality of ground engaging members. Each of the sides of the back member has a pair of spaced apart belt slots and the back surface of the back member has a handle slot. The back end of are base member is pivotally coupled to the back member. The rear end of a top member is coupled to the back member with the forward end of the top member outwardly extending from the front surface of the back member. The forward end of the top member has a holding bracket which is downwardly extended from the lower face of the top member.

8 Claims, 4 Drawing Sheets

6,042,130

CARRIER DEVICE

BACKGROUND OF THE INVENTION

1. Field of the Invention

The present invention relates to carrier devices for gas tanks, such as propane gas tanks and more particularly pertains to a new carrier device for holding a container, such as a propane gas tank.

2. Description of the Prior Art

The use of carrier devices for gas tanks, such as propane gas tanks is known in the prior art. More specifically, carrier devices for gas tanks, such as propane gas tanks heretofore devised and utilized are known to consist basically of familiar, expected and obvious structural configurations, notwithstanding the myriad of designs encompassed by the crowded prior art which have been developed for the fulfillment of countless objectives and requirements.

Known prior art carrier devices for gas tanks, such as propane gas tanks include U.S. Pat. No. 4,205,937; U.S. Pat. No. 3,456,960; U.S. Pat. No. 4,949,890; U.S. Pat. No. 4,940,003; U.S. Pat. No. 5,431,422; and U.S. Pat. No. 2,901,261.

While these devices fulfill their respective, particular objectives and requirements, the aforementioned patents do not disclose a new carrier device. The inventive device includes a back member having top and bottom ends and a pair of sides extending between the top and bottom ends of the back member. The bottom end of the back member has a plurality of ground engaging members. Each of the sides of the back member has a pair of spaced apart belt slots and the back surface of the back member has a handle slot. The back end of the base member is pivotally coupled to the back member. The rear end of a top member is coupled to the back member with the forward end of the top member outwardly extending from the front surface of the back member. The forward end of the top member has a holding bracket which is downwardly extended from the lower face of the top member.

In these respects, the carrier device according to the present invention substantially departs from the conventional concepts and designs of the prior art, and in so doing provides an apparatus primarily developed for the purpose of holding a container, such as a propane gas tank.

SUMMARY OF THE INVENTION

The general purpose of the present invention, which will be described subsequently in greater detail, is to provide a new carrier device apparatus and method which has many of the advantages of the carrier devices for gas tanks, such as propane gas tanks mentioned heretofore and many novel features that result in a new carrier device which is not anticipated, rendered obvious, suggested, or even implied by any of the prior art carrier devices for gas tanks, such as propane gas tanks, either alone or in any combination thereof.

To attain this, the present invention generally comprises a back member having top and bottom ends and a pair of sides extending between the top and bottom ends of the back member. The bottom end of the back member has a plurality of ground engaging members. Each of the sides of the back member has a pair of spaced apart belt slots and the back surface of the back member has a handle slot. The back end of the base member is pivotally coupled to the back member. The rear end of a top member is coupled to the back member with the forward end of the top member outwardly extending from the front surface of the back member. The forward end of the top member has a holding bracket which is downwardly extended from the lower face of the top member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new carrier device apparatus and method which has many of the advantages of the carrier devices for gas tanks, such as propane gas tanks mentioned heretofore and many novel features that result in a new carrier device which is not anticipated, rendered obvious, suggested, or even implied by any of the prior art carrier devices for gas tanks, such as propane gas tanks, either alone or in any combination thereof.

It is another object of the present invention to provide a new carrier device which may be easily and efficiently manufactured and marketed.

It is a further object of the present invention to provide a new carrier device which is of a durable and reliable construction.

An even further object of the present invention is to provide a new carrier device which is susceptible of a low cost of manufacture with regard to both materials and labor, and which accordingly is then susceptible of low prices of sale to the consuming public, thereby making such carrier device economically available to the buying public.

Still yet another object of the present invention is to provide a new carrier device which provides in the apparatuses and methods of the prior art some of the advantages thereof, while simultaneously overcoming some of the disadvantages normally associated therewith.

Still another object of the present invention is to provide a new carrier device for holding a container, such as a propane gas tank.

Yet another object of the present invention is to provide a new carrier device which includes a back member having top and bottom ends and a pair of sides extending between the top and bottom ends of the back member. The bottom end of the back member has a plurality of ground engaging members. Each of the sides of the back member has a pair of spaced apart belt slots and the back surface of the back member has a handle slot. The back end of base member is pivotally coupled to the back member. The rear end of a top member is coupled to the back member with the forward end of the top member outwardly extending from the front surface of the back member. The forward end of the top member has a holding bracket which is downwardly extended from the lower face of the top member.

Still yet another object of the present invention is to provide a new carrier device that allows safe transport of a propane gas tank in the truck of a car or on a seat and secured by a seatbelt.

Even still another object of the present invention is to provide a new carrier device that helps prevent unwanted rolling around of a gas tank when transporting the gas tank thereby reducing the risk of damage to the tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
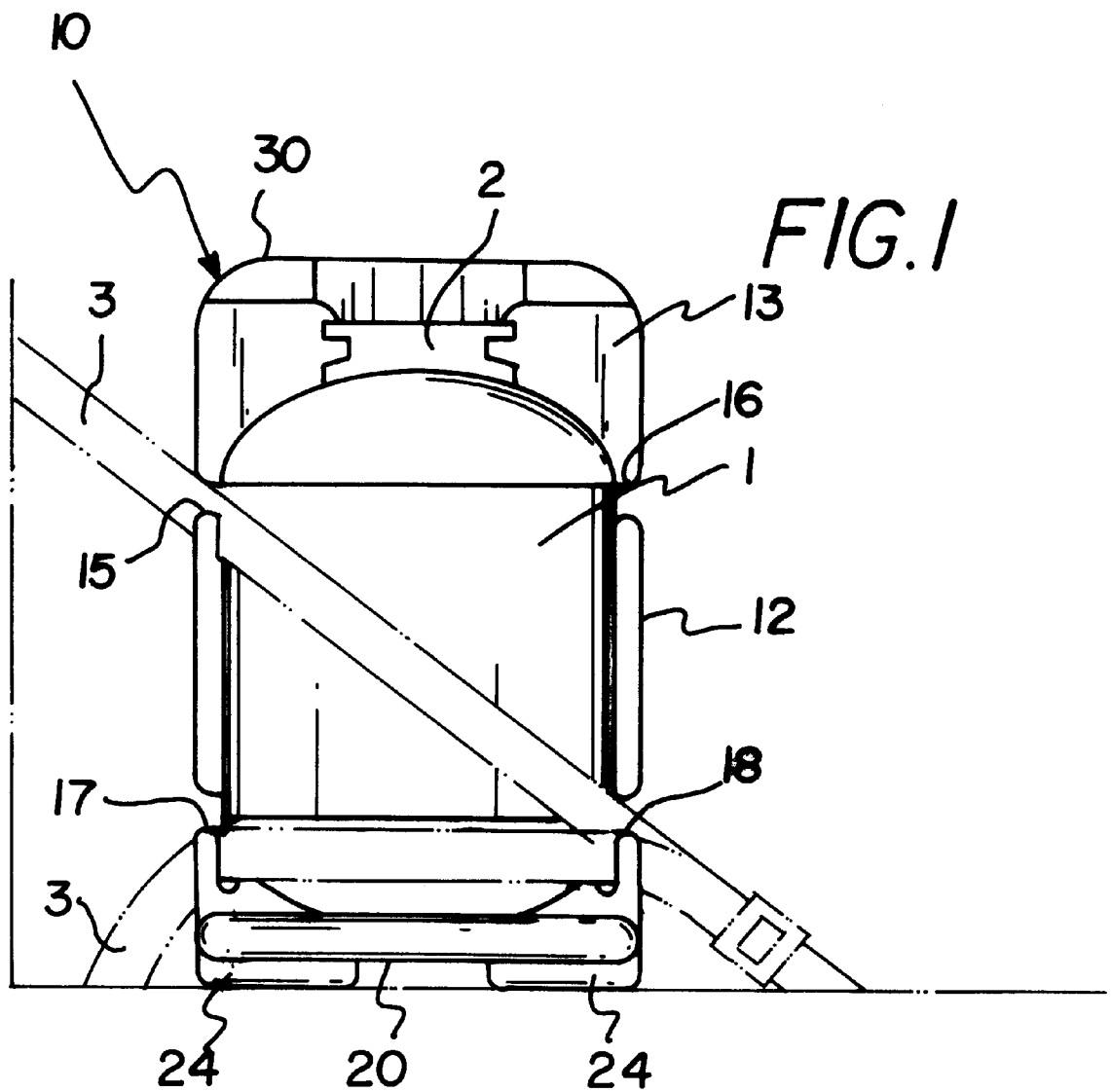
FIG. 1 is a schematic front view of a new carrier device in sue holding a propane gas tank to the seat of a vehicle according to the present invention.

With reference now to the drawings, and in particular to FIGS. 1 through 4 thereof, a new carrier device embodying the principles and concepts of the present invention and generally designated by the reference numeral 10 will be described.

As best illustrated in FIGS. 1 through 4, the carrier device 10 generally comprises a back member 12 having top and bottom ends and a pair of sides extending between the top and bottom ends of the back member 12. The bottom end of the back member 12 has a plurality of ground engaging members. Each of the sides of the back member 12 has a pair of spaced apart belt slots 15,16,17,18 and the back surface 14 of the back member 12 has a handle slot 19. The back end of the base member 20 is pivotally coupled to the back member 12. The rear end of a top member 30 is coupled to the back member 12 with the forward end of the top member 30 outwardly extending from the front surface 13 of the back member 12. The forward end of the top member 30 has a holding bracket 33 which is downwardly extended from the lower face 32 of the top member 30.

Figure 2:
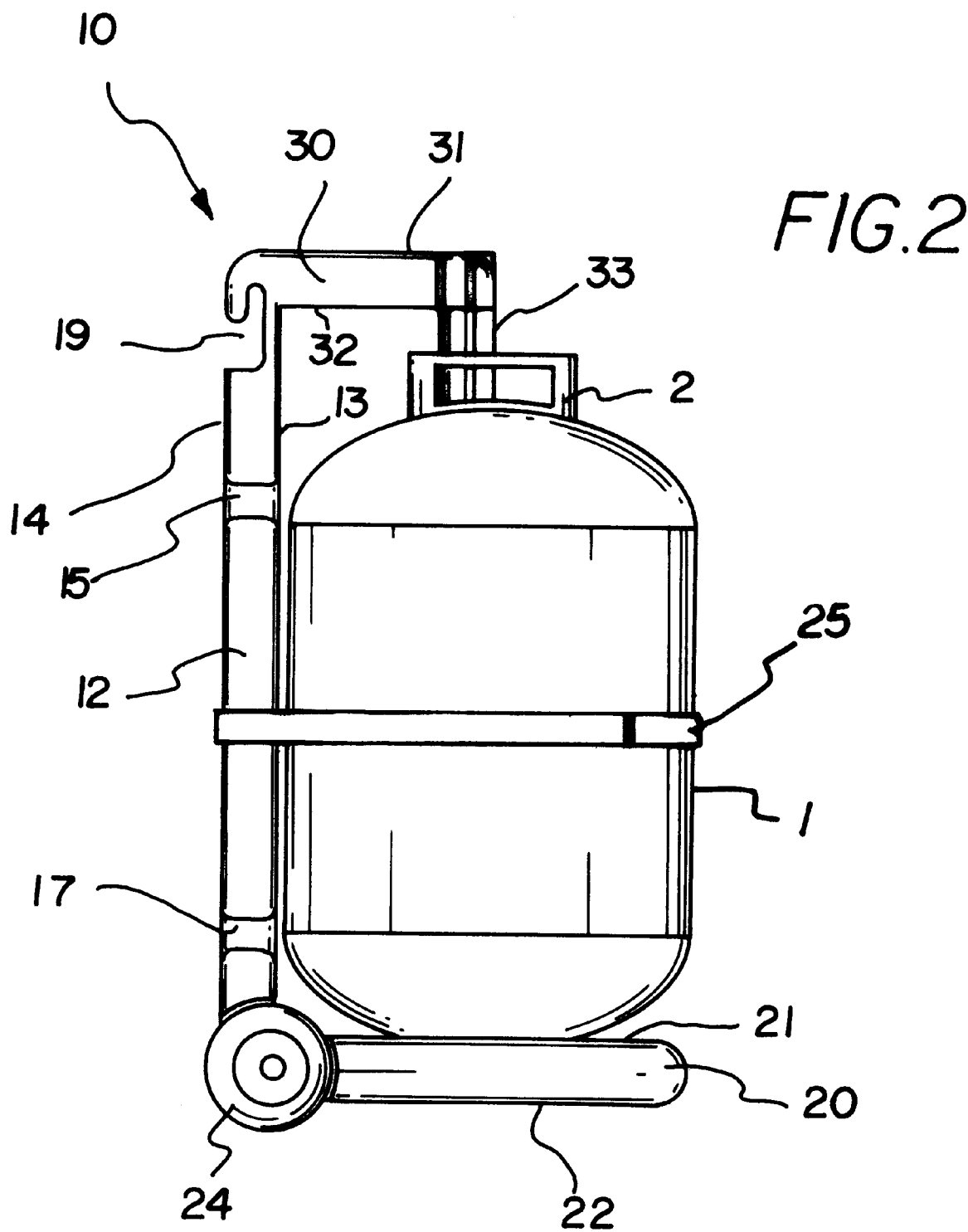
FIG. 2 is a schematic side view of the present invention in use holding a propane gas tank with the base member in the lowered position and also having an optional belt for holding the container tank to the back member.

In use, the carrier device 10 is designed for holding a generally cylindrical container tank 1 having a top handle portion 2. The carrier device is securable to a structure so that the tank 1 may be secured to the structure. In closer detail, the back member 12 is generally rectangular and has generally flat front and back surfaces 13,14, top and bottom ends and a pair of sides extending between the top and bottom ends of the back member 12. With reference to FIGS. 1 and 2, each of the sides of the back member 12 has a pair of spaced apart belt slots 15,16,17,18. One of the belt slots 15,17 of each of the sides of the back member 12 is positioned towards the top end of the back member 12 while the other belt slot 16,18 of each of the sides of the back member 12 is positioned towards the bottom end of the back member 12. As shown in FIG. 1, each of the belt slots 15,16,17,18 is designed for passing a seatbelt 3 therethrough to hold a container tank 1 to the back member 12 of the carrier device 10 and to hold the carrier device 10 to the seat of the vehicle.

The bottom end of the back member 12 has a plurality of ground engaging members which are ideally wheels 24 for aiding transport of the carrier device over a surface. The back surface 14 of the back member 12 also has a handle slot 19. The handle slot 19 is preferably positioned adjacent the top end of the back member 12. The handle slot 19 is designed for permitting a user to hold the back member 12 especially while rolling the carrier device 10 on a surface.

Figure 4:
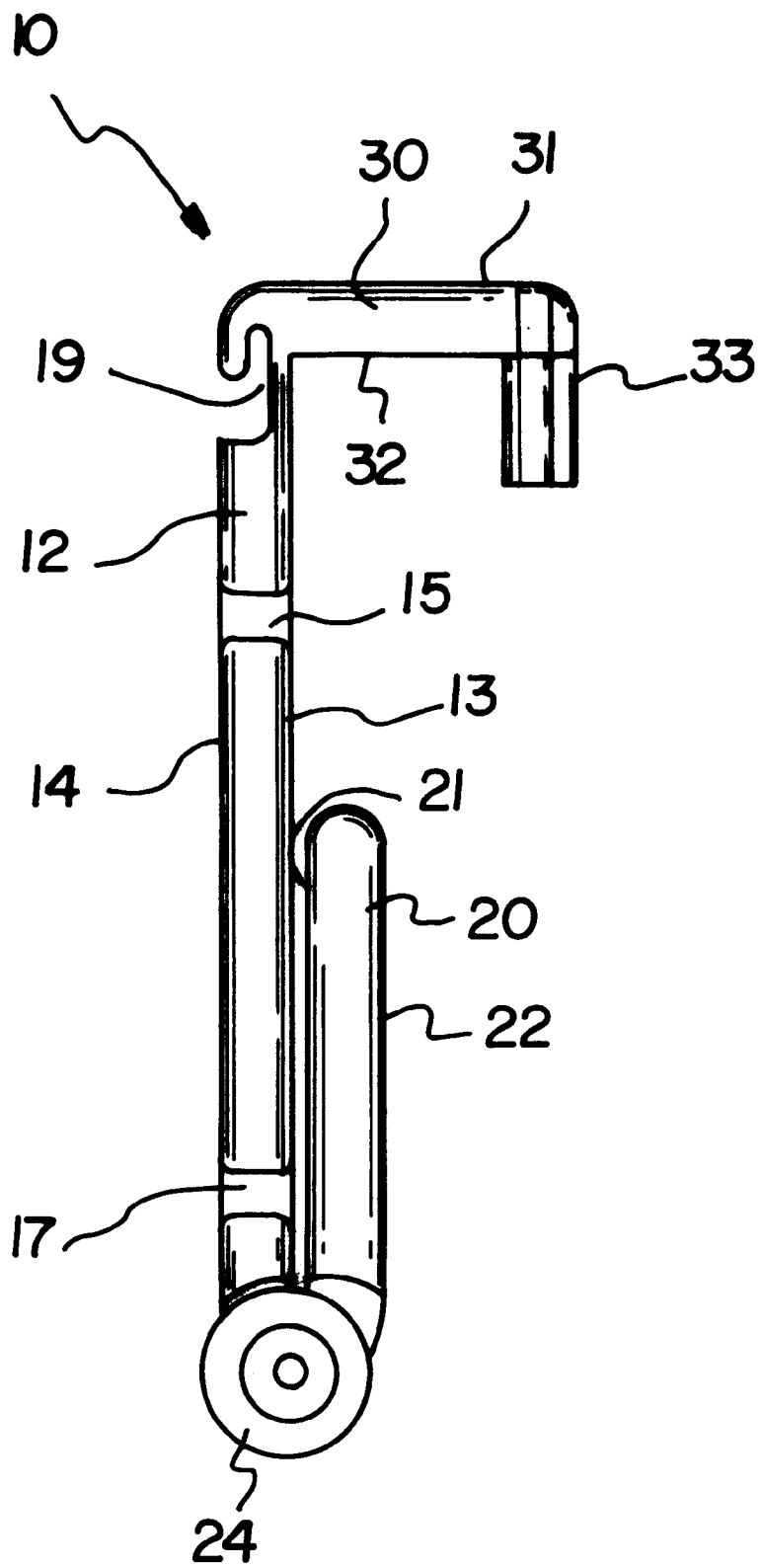
FIG. 4 is a schematic side view of the present invention with the base member in the raised position.

The base member 20 is designed for resting a container tank 1 thereon. The base member 20 is preferably generally rectangular and has generally flat top and bottom faces 21,22, and front and back ends. The back end of the base member 20 is pivotally coupled to the bottom end of the back member 12 so that the base member 20 is pivotable between a raised position and a lowered position. As depicted in FIG. 4, the base member 20 is generally parallel with the back member 12 when in the raised position. As shown in FIG. 2, the base member 20 is generally perpendicular to the back member 12 when in the lowered position. The top face 21 of the base member 20 preferably has a generally circular depression 23 therein. The depression 23 is designed for resting the bottom of a container tank 1 therein.

The top member 30 is generally rectangular and has generally flat upper and lower faces 31,32, and forward and rear ends. The rear end of the top member 30 is coupled to the top end of the back member 12 so that the forward end of the top member 30 outwardly extends from the front surface 13 of the back member 12. Preferably, the top member 30 is extended generally perpendicular to the back member 12. The forward end of the top member 30 has a holding bracket 33. The holding bracket 33 is preferably generally arcuate and has a concavity 34. The holding bracket 33 is downwardly extended from the lower face 32 of the top member 30 with the concavity 34 of the holding bracket 33 facing outwards from the forward end of the top member 30. With reference to FIG. 2, the holding bracket 33 is designed for extending into the top handle 2 of a container tank 1 such that the container tank 1 is held between the top member 30 and the base member 20.

Optionally as illustrated in FIG. 2, an elongate flexible belt 25 may be provided to loop around the container tank and the back member 12 to further secure the container tank on to the carrier device, especially when transporting the device to and from a vehicle. The ends of the flexible belt may be secured to each other by a fastener such as a hook and loop fastener or a buckle.

Figure 3:
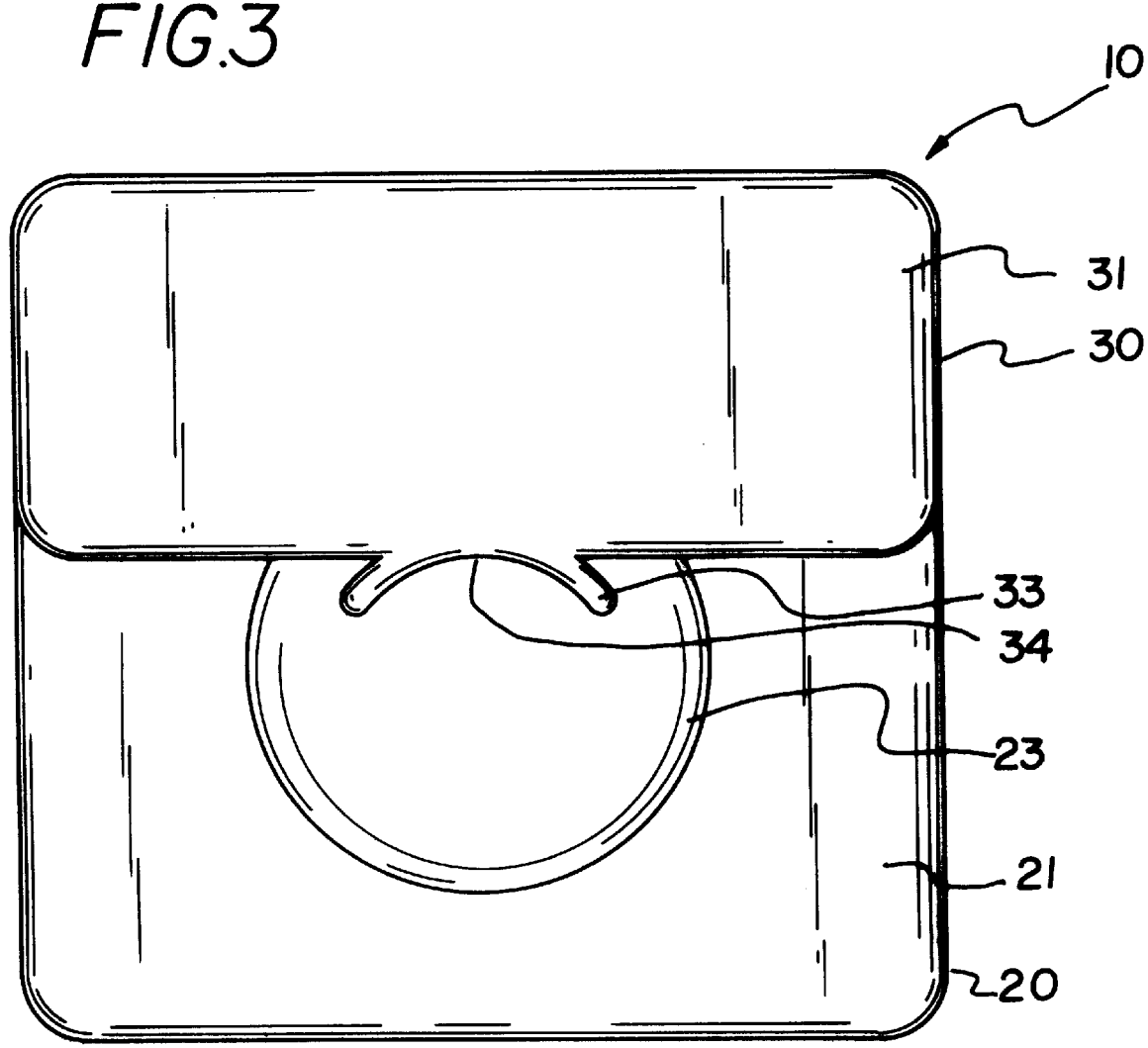
FIG. 3 is a schematic top view of the present invention.

In an ideal illustrative embodiment, the base member 20 has a length defined between the front and back ends of the base member 20 which is ideally at least as large as the diameter of the container tank 1 as shown in FIG. 2. The top member 30 has a length defined between the forward and rear ends of the top member 30. Ideally, as illustrated in FIG. 3, the length of the top member 30 is less than about one-half the length of the base member 20. In this ideal illustrative embodiment, the width of the top member 30 is substantially equal to the width of the base member 20 as measure between the sides of the back member 12 as shown in FIG. 3.

In use, the base member 20 is placed in the lower position so that a container tank 1 may be rested on the top face in the depression. The holding bracket 33 is inserted into the top handle 2 of the container tank 1 so that the container tank 1 is held between the base member 20 and the top member 30. The carrier device may be secured in a vehicle to prevent the container tank 1 by moving around during transport by extending straps, such as a seatbelt 3 through the belt slots.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A carrier device for a generally cylindrical container tank having a top and bottom, said carrier device being for transporting the container tank over a surface and for securing inside a vehicle having a seat belt, said carrier device comprising:

a back member having front and back surfaces, top and bottom ends and a pair of sides extending between said top and bottom ends of said back member;

said bottom end of said back member having a plurality of ground engaging members;

each of said sides of said back member having a pair of spaced apart belt slots, each belt slot having an opening into said belt slot extending from an associated side of said back member such that said belt slots are adapted for receiving the seat belt of the vehicle for securing said carrier device to the vehicle;

wherein one of said belt slots of each of said sides of said back member is positioned towards said top end of said back member, another of said belt slots of each of said sides of said back member is positioned towards said bottom end of said back member to form a pair of bottom belt slots, said bottom belt slots being located a distance from said bottom end of said back member such that said bottom belt slots are adapted for positioning the seat belt of the vehicle around the container tank for securing the container tank to the vehicle;

said back surface of said back member having a handle slot;

a base member having top and bottom faces, and front and back ends, said back end of said base member being pivotally coupled to said back member;

a top member having upper and lower faces, and forward and rear ends, said rear end of said top member being coupled to said back member, said forward end of said top member being outwardly extended from said front surface of said back member; and said forward end of said top member having a holding bracket, said holding bracket being downwardly extended from said lower face of said top member.

2. The carrier device of claim 1, said back member is generally rectangular, wherein said base member is generally rectangular, and wherein said top member is generally rectangular.

3. The carrier device of claim 1, wherein said ground engaging members comprise wheels.

4. The carrier device of claim 1, wherein said handle slot is positioned adjacent said top end of said back member.

5. The carrier device of claim 1, wherein said top face of said base member has a depression therein.

6. The carrier device of claim 1, wherein said rear end of said top member is coupled to said top end of said back member.

7. The carrier device of claim 1, wherein said holding bracket is generally arcuate and has a concavity, said concavity of said holding bracket facing outwards from said forward end of said top member.

8. A carrier device for a generally cylindrical container tank having a top and bottom, said carrier device comprising:

a back member being generally rectangular and having a generally flat front surface, a back surface, top and bottom ends and a pair of sides extending between said top and bottom ends of said back member;

said bottom end of said back member having a plurality of ground engaging members, wherein said ground engaging members comprise wheels for aiding transport of said carrier device over a surface;

each of said sides of said back member having a pair of spaced apart belt slots, each belt slot having an opening into said belt slot extending from an associated side of said back member such that said belt slots are adapted for receiving the seat belt of the vehicle for securing said carrier device to the vehicle;

one of said belt slots of each of said sides of said back member being positioned towards said top end of said back member, another of said belt slots of each of said sides of said back member being positioned towards said bottom end of said back member to form a pair of bottom belt slots, said bottom belt slots being located a distance from said bottom end of said back member such that said bottom belt slots are adapted for positioning the seat belt of the vehicle around the container tank for securing the container tank to the vehicle;

said back surface of said back member having a handle slot, said handle slot being positioned adjacent said top end of said back member, said handle slot being for permitting a user to hold said back member especially while rolling the carrier device on a surface;

a base member being for resting the container tank thereon, said base member being generally rectangular and having generally flat top and bottom faces, and front and back ends, said back end of said base member being pivotally coupled to said bottom end of said back member, said base member being pivotable between a raised and a lowered position;

wherein said base member has a length defined between said front and back ends of said base member, wherein said length of said base member is at least as large as the diameter of the container tank;

wherein said base member is generally parallel with said back member when in said raised position, wherein said base member is generally perpendicular to said back member when in said lowered position;

said top face of said base member having a depression therein, said depression being generally circular, said depression being for resting the bottom of a container tank therein;

a top member being generally rectangular and having generally flat upper and lower faces, and forward and rear ends, said rear end of said top member being coupled to said top end of said back member, said forward end of said top member being outwardly extended from said front surface of said back member, said top member being extended generally perpendicular to said back member;

wherein said top member has a length defined between said forward and rear ends of said top members wherein said length of said top member is less than about one-half said length of said base member;

wherein the width of the top member is substantially equal to the width of the base member as measured between the sides of the back member; and said forward end of said top member having a holding bracket, said holding bracket being generally arcuate and having a concavity, said holding bracket being downwardly extended from said lower face of said top member, said concavity of said holding bracket facing outwards from said forward end of said top member, said holding bracket being for extending into the top handle of the container tank such that the container tank is held between the top member and the base member.

* * * * *